United States Patent
Keith et al.

(10) Patent No.: US 8,479,298 B2
(45) Date of Patent: Jul. 2, 2013

(54) METHOD FOR ENCRYPTING AND EMBEDDING INFORMATION IN A URL FOR CONTENT DELIVERY

(75) Inventors: Chad C. Keith, San Antonio, TX (US); David Dunmire, San Antonio, TX (US); Clifford Marcus Owenby, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 291 days.

(21) Appl. No.: 12/847,731

(22) Filed: Jul. 30, 2010

(65) Prior Publication Data

US 2012/0030774 A1 Feb. 2, 2012

(51) Int. Cl.
*H04L 9/00* (2006.01)
(52) U.S. Cl.
USPC ............. 726/26; 726/27; 726/30; 713/168
(58) Field of Classification Search
USPC ............. 713/150, 161–163, 168–170, 176, 713/178, 189; 726/2–4, 27–30
See application file for complete search history.

(56) References Cited

U.S. PATENT DOCUMENTS

| | | | |
|---|---|---|---|
| 6,317,718 B1 | 11/2001 | Fano | |
| 6,993,580 B2 | 1/2006 | Isherwood et al. | |
| 6,993,707 B2 | 1/2006 | Baker et al. | |
| 7,103,351 B2 | 9/2006 | Chaudhari et al. | |
| 7,254,387 B2 | 8/2007 | Dunlop et al. | |
| 7,299,500 B1 * | 11/2007 | Klebe et al. | 726/26 |
| 7,533,144 B2 | 5/2009 | Kassab | |
| 7,716,077 B1 | 5/2010 | Mikurak | |
| 7,752,080 B1 | 7/2010 | Greener | |
| 7,752,292 B1 | 7/2010 | Katzer | |
| 7,870,293 B2 | 1/2011 | Tso | |
| 7,912,445 B2 | 3/2011 | Maes | |
| 7,941,557 B2 | 5/2011 | Zhu et al. | |
| 7,941,562 B2 | 5/2011 | Cheng et al. | |
| 8,032,397 B2 | 10/2011 | Lawless | |
| 8,086,219 B2 | 12/2011 | O'Neil et al. | |
| 8,099,316 B2 | 1/2012 | Moukas et al. | |
| 8,160,916 B2 | 4/2012 | Moukas et al. | |
| 8,204,202 B2 | 6/2012 | Tao | |
| 2002/0087661 A1 | 7/2002 | Matichuk et al. | |
| 2002/0091568 A1 | 7/2002 | Kraft et al. | |
| 2002/0138331 A1 | 9/2002 | Hosea et al. | |
| 2003/0032409 A1 | 2/2003 | Hutcheson et al. | |
| 2003/0120502 A1 | 6/2003 | Robb et al. | |
| 2005/0034063 A1 | 2/2005 | Baker et al. | |
| 2007/0027784 A1 | 2/2007 | Kahn, IV et al. | |

(Continued)

OTHER PUBLICATIONS

U.S. Appl. No. 12/720,217, filed Mar. 9, 2010, David Dunmire.

(Continued)

*Primary Examiner* — Hosuk Song
(74) *Attorney, Agent, or Firm* — Woodcock Washburn LLP

(57) ABSTRACT

A method for accessing a remote network includes identifying a content server associated with the remote network, generating a uniform resource locator, embedding additional data in the uniform resource locator, encrypting the uniform resource locator, and accessing a server in the remote network identified by the uniform resource locator. The method further includes wherein the additional data comprises authentication data, a delivery session identification, a time stamp, or comprises subscriber identification data. The URL may provide access to the content server for a time period indicated by the time stamp. The method includes wherein at least the subscriber identification data prevents unauthorized sharing of the URL.

10 Claims, 3 Drawing Sheets

U.S. PATENT DOCUMENTS

| | | |
|---|---|---|
| 2007/0047523 A1 | 3/2007 | Jiang |
| 2007/0130505 A1 | 6/2007 | Woods |
| 2008/0154656 A1 | 6/2008 | Kail et al. |
| 2009/0019535 A1 | 1/2009 | Mishra et al. |
| 2009/0138563 A1 | 5/2009 | Zhu et al. |
| 2009/0156213 A1 | 6/2009 | Spinelli et al. |
| 2009/0185669 A1 | 7/2009 | Zitnik et al. |
| 2009/0210702 A1 | 8/2009 | Welingkar et al. |
| 2010/0042688 A1 | 2/2010 | Maghraby |
| 2010/0077321 A1 | 3/2010 | Shen et al. |
| 2010/0080361 A1 | 4/2010 | Houghton |
| 2010/0138480 A1 | 6/2010 | Benedetto |
| 2010/0280962 A1 | 11/2010 | Chan |
| 2010/0292556 A1 | 11/2010 | Golden |
| 2011/0131408 A1* | 6/2011 | Cook et al. .................. 713/153 |
| 2011/0225060 A1 | 9/2011 | Dunmire |
| 2011/0225061 A1 | 9/2011 | Keith et al. |
| 2011/0225320 A1 | 9/2011 | Keith et al. |
| 2011/0225636 A1 | 9/2011 | Keith |
| 2012/0030019 A1 | 2/2012 | Dunmire |
| 2012/0030478 A1 | 2/2012 | Dunmire |

OTHER PUBLICATIONS

U.S. Appl. No. 12/720,277, filed Mar. 9, 2010, Chad C. Keith.
U.S. Appl. No. 12/720,300, filed Mar. 9, 2010, Chad C. Keith.
U.S. Appl. No. 12/847,635, filed Jul. 30, 2010, David Dunmire.
U.S. Appl. No. 12/847,774, filed Jul. 30, 2010, David Dunmire.
U.S. Appl. No. 12/847,793, filed Jul. 30, 2010, Chad C. Keith.
Kushan, Mitra, "The next 400 million; Though voice still remains the money spinner, telecom operators and handset makers are betting big on services to acquire the next 400 million customers, Kushan Mitra goes into the details", Business Today, New Delhi, May 3, 2009, pp. 1-7.
M2 Presswire, "IMImobile: IMImobile Announces first fully Integrated MobileAd Platform", Coventry: Jan. 22, 2008, p. 1.

* cited by examiner

| Request Element Name | Type | Legal Values | Required | Child of | Comments/Example |
|---|---|---|---|---|---|
| a | String | | Yes | | Base 64 encoded ENCRYPTEDSTRING is formulated as follows AES256("msisdn=MSISDN&url_content_path=PATH&dsid=DELIVERYSESSIONID&ts=timestamp in UTC"). |
| msisdn | Number | | Yes | | End user's MSISDN. Telephone number that will be charged for the current transaction. This value must be 12 |
| url_content_path | String | | Yes | | Remote Url of the content |
| dsid | String | | Yes | | Unique Delivery Session id. |
| ts | String | | Yes | | TimeStamp in UTC. Format yyyy-MM-dd'T'HH:mm:ss'Z' |
| iv | String | | Yes | | Base 64 encoded 128 bit INITALIZATION_VECTOR |

Figure 3

METHOD FOR ENCRYPTING AND EMBEDDING INFORMATION IN A URL FOR CONTENT DELIVERY

CROSS-RELATED UNITED STATES APPLICATIONS

This application is related to U.S. application Ser. Nos. 12/720,217, 12/720,277, and 12/720,300, all filed on Mar. 9, 2010 and assigned to the assignee of this application, each of which is hereby incorporated by reference in its entirety. This application is also related to United States patent applications entitled "DYNAMIC STORAGE ENABLER FOR SERVICE DELIVERY HUB ON A MOBILITY NETWORK", "ENABLERS FOR SERVICE DELIVERY HUB ON A MOBILITY NETWORK", and "METHOD FOR AUTOMATING OBOARDING OF USER GENERATED RINGBACK TONES TO SALES DISTRIBUTION CHANNEL" being filed concurrently herewith and assigned to the assignee of this application.

TECHNICAL FIELD

This application is directed to a service delivery platform, and more particularly, to a system, apparatus, and method for embedding information in an encrypted uniform resource locator (URL).

BACKGROUND

With the proliferation of the interoperability of networks and the ability to have a single network access multiple remote networks, there is now the ability for a user on one network to access content on one of the other remote networks. Access to such remote networks is typically provided through a uniform resource locator ("URL"). A user will provide the URL to his or her home network and the home network will resolve the URL to determine the appropriate network which to route the requests. For example, a user in Mexico may want to access content on a network in the United States. The network in Mexico would have to know something about the structure of the network in the United States for this to occur. Assuming the proper routing logic and interconnections are in place, a URL may provide the destination point for the user.

Such remote access is powerful for those seeking content, but provides serious security risks for the content providers and the remote network being accessed. There is no way of uniquely identifying or authorizing an individual user or subscriber to access content. Moreover, once releasing the URL, there is no way for the content provider to prevent the sharing of the URL with unauthorized users. Finally, there is currently no way to limit the time duration that such access is granted, leaving the content owner exposed to obligations to provide access to content it may have legitimately sold that has never been accessed by the purchaser, even as that content has been updated.

As such, there is a need for a system and method for embedding additional data in a URL and further encrypting that URL with the additional data to provide secure access to a user on a remote network.

SUMMARY

A method for accessing a remote network includes identifying a content server associated with the remote network, generating a uniform resource locator, embedding additional data in the uniform resource locator, encrypting the uniform resource locator, and accessing a server in the remote network identified by the uniform resource locator. The method further includes wherein the additional data comprises authentication data, a delivery session identification, a time stamp, or comprises subscriber identification data. The URL may provide access to the content server for a time period indicated by the time stamp. The method includes wherein at least the subscriber identification data prevents unauthorized sharing of the URL.

The disclosure also includes a method of embedding additional data in a uniform resource locator, including generating a unique uniform resource locator comprising a data path, identifying additional data to be embedded in the URL, the additional data comprising a user identifier and a unique delivery session ID; and encrypting the unique URL including the additional data. The method further includes embedding a time stamp indicating a time period during which the URL will provide access. The additional data prevents unauthorized use of the URL.

BRIEF DESCRIPTION OF THE DRAWINGS

The following description is better understood when read in conjunction with the appended drawings, wherein

FIG. 3 is a description of an exemplary embodiment of an encrypted uniform resource locator.

DETAILED DESCRIPTION OF ILLUSTRATIVE EMBODIMENTS

Figure 1:
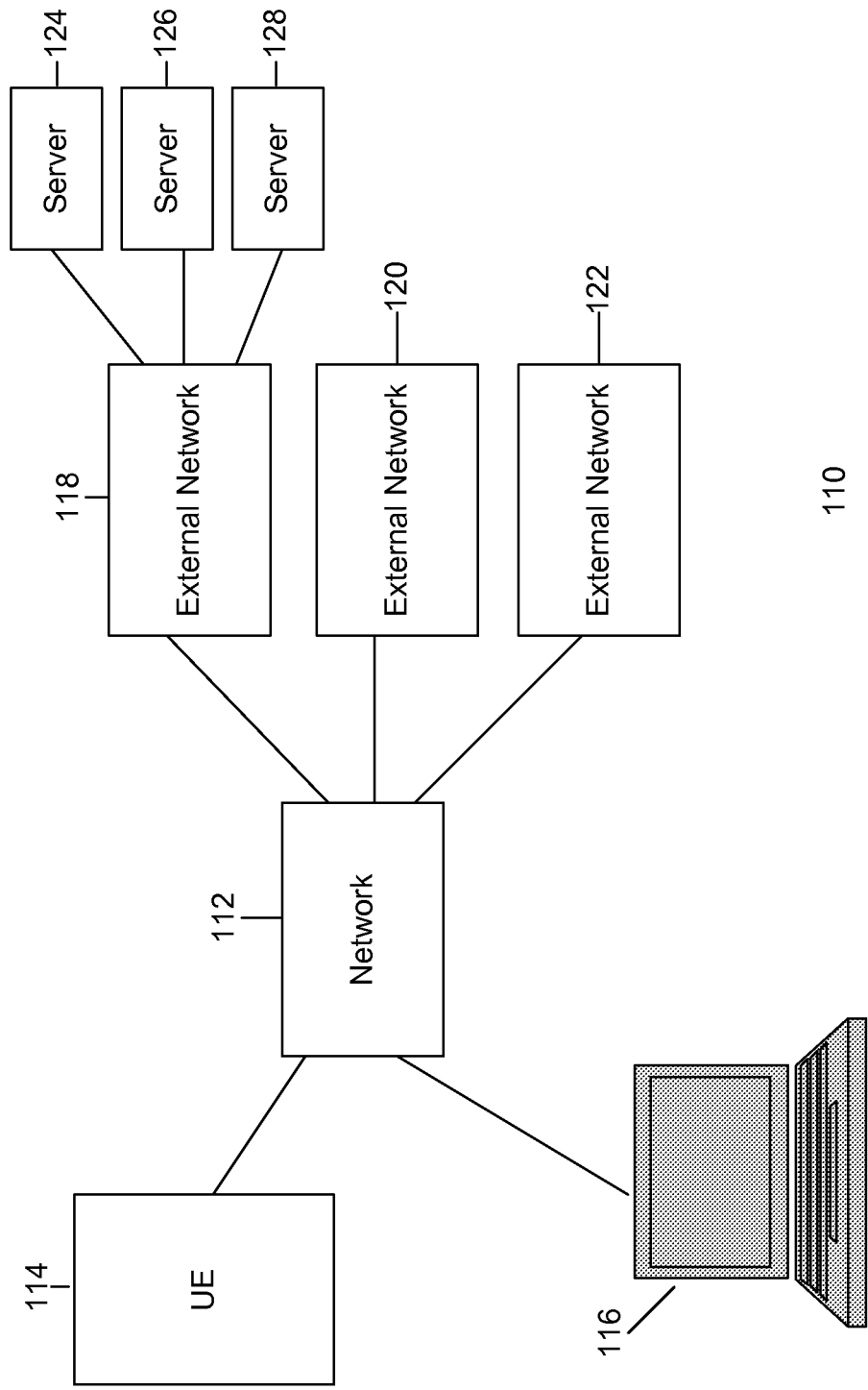
FIG. 1 is a simplified block diagram illustrating the addressing of content in a remote network in accordance with an exemplary embodiment of the disclosure.

For the purposes of describing an exemplary embodiment of the disclosure, reference will be made to the figures set forth above. With reference to FIG. 1, there is shown an exemplary block diagram of a computing environment 10 in which the present disclosure may be implemented. There is shown a network 112 which may, for example, be a cellular wireless network, including but not limited to CDMA, TDMA, 2.5G, 3G and 4G type networks. Network 112 may be any other type of communications network as well, including but not limited to LANa, WANa, Wi-Fi, Wi-Max, IP and other data networks, including the Internet. Network 112 may be wired or wireless or a combination of the two. Exemplary user equipment (UE) is shown as handset 114 and laptop 116, each of which is connected to network 112 via a cellular network. For the purposes of description of an embodiment, UE will be referred to generically in this disclosure as UE 114. Also connected to network 112 are external networks 118, 120, and 122. Each of the external networks 118, 120, and 122 are connected to network 112 through gateways or other communications network elements as known by those skilled in the art, and may include, for example, other cellular networks or the internet. Exemplary servers 124, 126, 128 are shown in communication with external network 118. Exemplary servers 124, 126, 128 may include servers operated by content providers or content aggregators which may be accessible by users of external network 118 or any other external networks.

Figure 2:
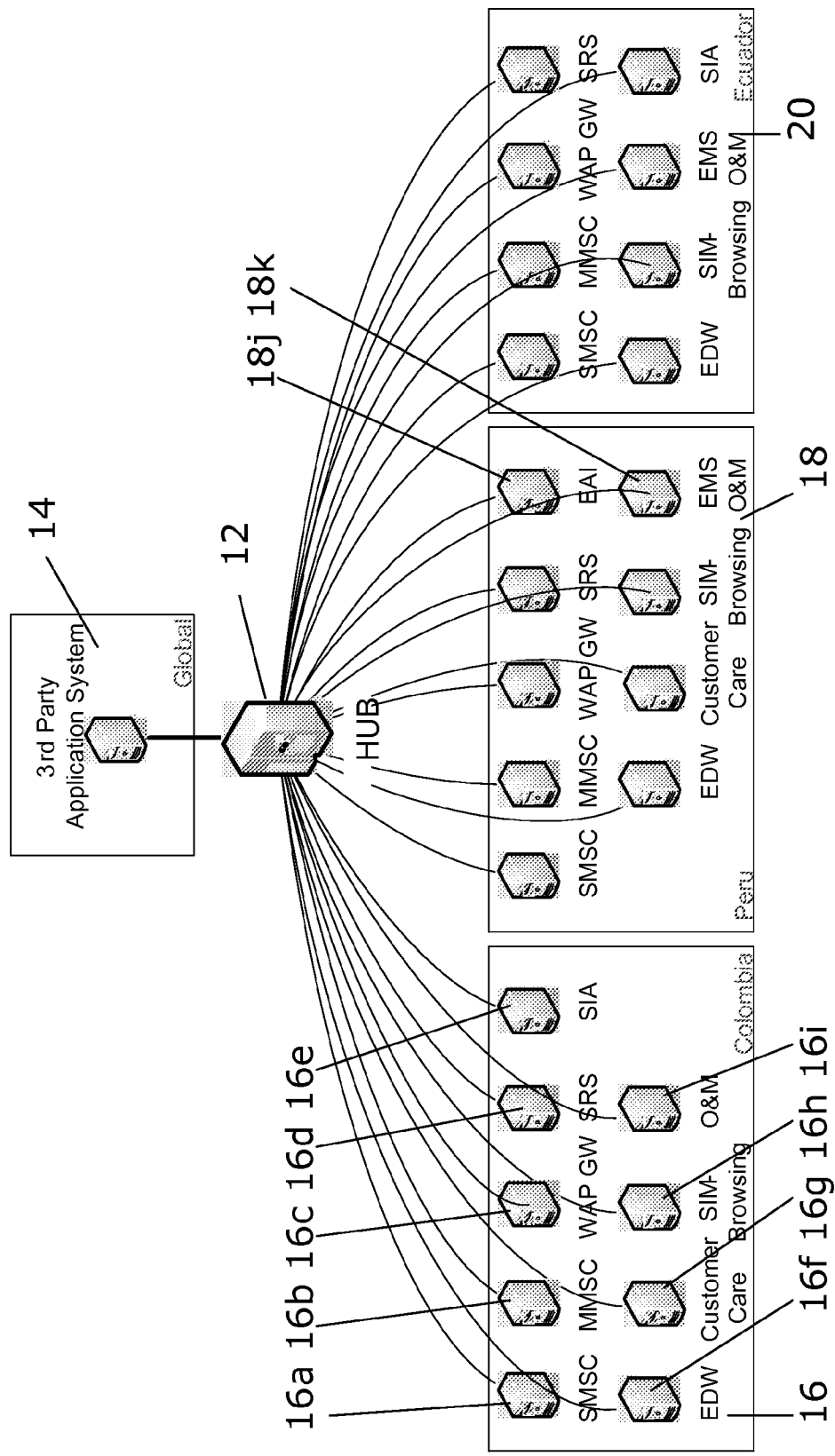
FIG. 2 is a system diagram of an exemplary embodiment of the disclosure illustrating a service delivery hub in communication with remote networks.

An exemplary embodiment of a more robust network system in which the disclosure may be implemented is shown in FIG. 2 in which a service delivery hub 12 is used as an access point to several external networks. While the present disclosure will be described at least in part with respect to FIG. 2, there is no requirement that a service delivery hub 12 architecture be used. The disclosure is applicable to any server or sales portal. With reference to FIG. 2, there is shown a system 10 having a service delivery hub 12 in communication with network operations 16, 18, and 20. As described more fully herein, the service delivery hub 12 provides a central access point for third party application service providers (ASPs), aggregators, and enabler providers and includes a set of application programming interfaces (APIs) provided by the network provider or other third parties. The service delivery hub 12 also includes a charging gateway which provides the capability for third parties to monetize applications and a settlement center which balances accounts of multiple parties and network operators in accordance with contractual fee splitting arrangements or other mechanisms determined by the parties, so-called recursive settlements. The service delivery hub 12 also includes a control center to manage access to the system.

Referring again to FIG. 2, there is shown a third party application server 14 in communication with the service delivery hub 12. The service delivery hub 12 is targeted to produce an integration layer for access to the network operations 16, 18, and 20, specifically network elements, operational support systems and business support systems (OSS/BSS), and Internet application service providers (ASPs). The network operations 16, 18, and 20 (also referred to as networks herein) are illustrative only and could vary in number from one to many networks. The networks may be stand alone networks in a particular geographic area, which areas may be delineated on a country or state basis or any other geographic distinction. The networks may also be delineated by network operator or network type. There may also be more than one network in any one geographic region.

In the exemplary embodiment of FIG. 2, network operations 16 are designated as being in the country of Columbia, network operations 18 in Peru, and network operations 20 in Ecuador. Within each network operations 16, 18, 20, there is shown a representative sample of network subsystems contained therein and, in the case of network operations 16 in Columbia, shown numbered as 16a-16i. Those subsystems within network operations 16 include the short message service center (SMSC) 16a, multi-media service center (MMSC) 16b, wireless access protocol (WAP) gateway 16c, CPW 16d, CMG 16e, enterprise data warehouse (EDW) 16f, customer care 16g, subscriber interface module (SIM) browsing 16h, and operations and maintenance (O&M) 16i. It will be understood by those skilled in the art that not all subsystems are necessarily found in each network operations 16, 18, 20 and there may be other subsystems not listed above, for example, enterprise application integration (PGW) 18j, and emergency management systems (EMS) 18k are illustrated as part of network operation 18 but not as part of network operation 16.

The service delivery hub 12 exposes access to third party applications to network services provided by the network subsystems. The service delivery hub 12 supports third party developed services and controls application usage of network operations and third party services. It is preferred that the service delivery hub employ industry standards known to those skilled in the art or to be developed by the industry, including but not limited to Parlay X, SOAP, REST, HTTPS, JKD 1.5, XML, SSL+X509 certification for transport security, and WSSE username token profile security.

The service delivery hub 12, has interfaces into each of the subsystems within network operations 16, 18, 20. An exemplary methodology for using those interfaces may include establishing a VPN tunnel from the service delivery hub 12 to the subsystem of interest. Thus, if an application residing on the third party application system server 14 desires access to SMSC 16a, the service delivery hub 12 will establish a VPN tunnel or other connection to SMSC 16a thereby providing the application access to SMSC 16a.

In conjunction with the exemplary embodiments of FIG. 1 and FIG. 2, content may be provided through server 124 on external network 118 and be made available to UE 114 through network 112. In order to provide such access, a modified uniform resource locator ("URL") may be utilized. An unmodified uniform resource locator is a uniform resource identifier ("URI") and typically comprises data that specifies where an identified resource is available on a network and the mechanism for retrieving it. Unmodified URLs are known in the art and may comprise a scheme name or protocol, a hostname or an IP address, a port number, the path through the network, a query string and an anchor.

In an embodiment of the present disclosure, content may be made available to UE 114 through network 112 using a modified and then encrypted URL. In addition to the typical data included in a URL, additional data may be included in the modified URL and may, for example, comprise a delivery session identifier (may be a one-time identifier that is verifiable by the remote network); a time stamp, a content identifier, permission and authentication data, a MSISDN or other subscriber or UE information. The additional data may serve the function of uniquely identifying a subscriber authorized to access content found at the URL on the remote network. Such access may be further limited to a time period surrounding the generation of the modified URL. The additional data may also serve to prevent the sharing of a URL with unauthorized subscribers.

FIG. 3 shows an exemplary and non-limiting example of a modified URL. The modified URL may be formatted as shown and includes a string (element "a") to be encrypted, a number representing the MSISDN, a string representing the URL contact path, a string representing the unique delivery session id, a string representing a time stamp, and a string representing a base 64 encoded 128 bit INITIALIZATION_VECTOR. While FIG. 3 indicates that the data fields in the modified URL are required, in accordance and consistent with the present disclosure, it will be understood that a subset of the data fields may also be present and there may be additional parameters embedded in the modified URL. Such additions or subtractions are considered within the scope of the present disclosure.

The modified URL may be encrypted to prevent or reduce the possibility of unauthorized copying and access. The URL may, for example, be encrypted using the AES256 method of encryption or any other type of encryption method now known or to be developed.

In operation, a UE 114 may desire to access hosted content external to the network 112 managing the current browsing session of the UE 114. The external content may be stored in server 124 on external network 118. In order to securely deliver the hosted content to UE 114, the method includes creating a unique and encrypted path and additional data embedded in a URL that redirects the UE 114 to the server 124 on network 118. The server 118 decrypts the URL which provides access to the content as well as access permission information verifying access to the content. The method securely masks the embedded details of the URL using encryption while providing content identification on the external network 118 without necessarily having knowledge of the external network 118. As part of the creation of the content metadata, the content provider may provide a path structure that may be included in the encrypted data thus when decrypted, the content provider will be able to decipher its own path structure to access the content for delivery. Moreover, the method provides access control limitations so that the URL may not be saved, copied or reused in any fashion without proper authorization. A timer along with user license information may be included in the URL. The timer may be used to register when the content was initially accessed may validate the access for a predetermined or variable time period. Upon the expiration of the time period, the UE 114 must request a new unique URL for access to the same content. The included license serves to identify the user for the content providers records and may also be used in a call-back function to the UE 114 as an additional verification of the validity of the license to the content. 1

The system and method provide certain benefits. It creates a trusted relationship wherein an unknown user operating UE 114 may purchase content on an external network 118 or the Internet and the delivery of such content while providing an excellent user experience. The user is able to pass securely from the purchase process on one site or one network to the delivery process of another site or another network without either entity having any real knowledge of the other's internal processes.

While the method for uniquely embedding additional data in a URL and encrypting that modified URL has been described in connection with the various embodiments of the various figures, it is to be understood that other similar embodiments can be used or modifications and additions can be made to the described embodiment for performing the same types of functionality in service delivery without deviating therefrom. For example, one skilled in the art will recognize that the system and method is not limited to any particular type of network or relationship between a hosted network and a remote network and may include operations on the Internet. Any type of telecommunications network may be supported, including but not limited to GSM, CDMA, EDGE, 3G, 4G, LTE, WiFi, Wi-Max, the Internet or any other wired or wireless network. While an exemplary list of command parameters has been described, a subset of those parameters and additional parameters may be defined by network operators or content providers. Therefore, the system and method should not be limited to any single embodiment, but rather should be construed in breadth and scope in accordance with the appended claims.

What is claimed:

1. A method comprising:
   identifying a content server associated with a remote network;
   generating a uniform resource locator;
   embedding additional data in the uniform resource locator, wherein:
      the additional data comprises subscriber identification data; and
      the subscriber identification data prevents unauthorized sharing of the uniform resource locator;
   encrypting the uniform resource locator; and
   accessing a server in the remote network identified by the uniform resource locator.

2. The method of claim 1 wherein the additional data comprises authentication data.

3. The method of claim 1 wherein the additional data comprises a delivery session identification.

4. The method of claim 1 wherein the additional data comprises a time stamp.

5. The method of claim 4 wherein the uniform resource locator provides access to the content server for a time period indicated by the time stamp.

6. The method of claim 1 wherein the additional data prevents unauthorized sharing of the uniform resource locator.

7. A method comprising
   generating, by a server, a unique uniform resource locator comprising a data path;
   identifying, by the server, additional data to be embedded in the unique uniform resource locator, the additional data comprising a user identifier and a unique delivery session ID, wherein the user identifier prevents unauthorized sharing of the unique uniform resource locator; and
   encrypting the unique uniform resource locator including the additional data.

8. The method of claim 7 further comprising embedding a time stamp indicating a time period during which the unique uniform resource locator will provide access.

9. The method of claim 8 wherein the additional data prevents unauthorized use of the unique uniform resource locator.

10. The method of claim 7 wherein the additional data prevents unauthorized use of the unique uniform resource locator.

* * * * *